(12) United States Patent
Kiryu (10) Patent No.: US 11,108,766 B2
(45) Date of Patent: Aug. 31, 2021

(54) INFORMATION PROCESSING APPARATUS AND INFORMATION PROCESSING SYSTEM

(71) Applicant: FUJIFILM BUSINESS INNOVATION CORP., Tokyo (JP)

(72) Inventor: Shunsuke Kiryu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 277 days.

(21) Appl. No.: 16/002,615

(22) Filed: Jun. 7, 2018

(65) Prior Publication Data

US 2018/0375856 A1 Dec. 27, 2018

(30) Foreign Application Priority Data

Jun. 21, 2017 (JP) .............................. JP2017-121116

(51) Int. Cl.
*H04L 29/06* (2006.01)

(52) U.S. Cl.
CPC ...... *H04L 63/0853* (2013.01); *H04L 63/0884* (2013.01); *H04L 63/083* (2013.01)

(58) Field of Classification Search
CPC ............. H04L 63/0853; H04L 63/0884; H04L 63/083; G06F 21/31; G06F 21/608; G06F 3/1238; G06F 21/34; H04N 1/4413; H04N 1/4426

See application file for complete search history.

(56) References Cited

U.S. PATENT DOCUMENTS

| | | | |
|---|---|---|---|
| 7,752,450 B1 * | 7/2010 | Palmer ................ | G06Q 20/206 713/183 |
| 7,882,538 B1 * | 2/2011 | Palmer ................ | G06F 21/445 726/1 |

(Continued)

FOREIGN PATENT DOCUMENTS

| | | |
|---|---|---|
| JP | 2010-128555 A | 6/2010 |
| JP | 2014-071788 A | 4/2014 |

OTHER PUBLICATIONS

Mar. 2021 Office Action issued in Japanese Patent Application No. 2017-121116.

*Primary Examiner* — David Garcia Cervetti
(74) *Attorney, Agent, or Firm* — Oliff PLC (57) ABSTRACT

An information processing apparatus includes a memory, a request unit, an authenticating unit, and a determination unit. The memory stores authentication information for performing user authentication. When authentication information of a user who is a target of the user authentication is not stored in the memory, the request unit requests the authentication information from a different information processing apparatus. The authenticating unit performs the user authentication by using the authentication information stored in the memory or obtained from the different apparatus in response to the request from the request unit. The determination unit determines whether the apparatus or the different apparatus is to store the authentication information. When the authentication information is not stored in the apparatus, if it is determined that the apparatus is to store the authentication information, the memory stores the authentication information obtained in response to the request from the request unit.

13 Claims, 3 Drawing Sheets

(56) References Cited

U.S. PATENT DOCUMENTS

| | | | | |
|---|---|---|---|---|
| 8,806,594 | B2* | 8/2014 | Ueno | H04N 1/00204 |
| | | | | 726/6 |
| 9,600,656 | B1* | 3/2017 | Wellinghoff | G06F 21/45 |
| 2006/0277599 | A1* | 12/2006 | Lamplough | H04N 1/32101 |
| | | | | 726/5 |
| 2009/0288138 | A1* | 11/2009 | Kalofonos | H04L 63/0884 |
| | | | | 726/2 |
| 2011/0016521 | A1* | 1/2011 | Kigo | G06F 21/46 |
| | | | | 726/19 |
| 2014/0118768 | A1* | 5/2014 | Yokomizo | H04N 1/4433 |
| | | | | 358/1.13 |
| 2015/0172267 | A1* | 6/2015 | Sato | H04L 63/08 |
| | | | | 726/3 |
| 2015/0347614 | A1* | 12/2015 | Knight | G06F 16/957 |
| | | | | 707/692 |
| 2015/0373011 | A1* | 12/2015 | Subramanya | G06F 21/31 |
| | | | | 726/9 |
| 2015/0378648 | A1* | 12/2015 | Yasukawa | G06F 3/1219 |
| | | | | 358/1.14 |
| 2016/0006887 | A1* | 1/2016 | Takenaka | H04N 1/0097 |
| | | | | 358/1.13 |
| 2017/0046105 | A1* | 2/2017 | Masui | G06F 3/1293 |
| 2017/0064101 | A1* | 3/2017 | Kitamura | H04N 1/33392 |
| 2017/0085568 | A1* | 3/2017 | Rolfe | H04L 63/06 |
| 2017/0091123 | A1* | 3/2017 | Sato | G06F 12/1441 |
| 2017/0272446 | A1* | 9/2017 | Yano | G06F 1/3284 |
| 2018/0247048 | A1* | 8/2018 | Sakemi | G06F 21/45 |
| 2018/0270392 | A1* | 9/2018 | Araki | H04N 1/4413 |

* cited by examiner

INFORMATION PROCESSING APPARATUS AND INFORMATION PROCESSING SYSTEM

CROSS-REFERENCE TO RELATED APPLICATIONS

This application is based on and claims priority under 35 USC 119 from Japanese Patent Application No. 2017-121116 filed Jun. 21, 2017.

BACKGROUND

(i) Technical Field

The present invention relates to an information processing apparatus and an information processing system.

(ii) Related Art

In user authentication performed in an information processing apparatus such as an image forming apparatus, authentication information stored in an external authentication server may be used. At that time, when the image forming apparatus fails to communicate with the external authentication server, for example, due to a communication failure, it is not possible to authenticate a user. In this case, the user is authenticated by using authentication information stored temporarily in an information processing apparatus. This is a known method.

SUMMARY

According to an aspect of the invention, there is provided an information processing apparatus including a memory, a request unit, an authenticating unit, and a determination unit. The memory stores authentication information for performing user authentication. When authentication information of a user who is a target of the user authentication is not stored in the memory, the request unit requests the authentication information of the user from a different information processing apparatus. The authenticating unit performs the user authentication by using the authentication information stored in the memory or the authentication information obtained from the different information processing apparatus in response to the request from the request unit. The determination unit determines whether the information processing apparatus or the different information processing apparatus is to store the authentication information. When the authentication information is not stored in the information processing apparatus, if it is determined that the information processing apparatus is to store the authentication information, the memory stores the authentication information obtained in response to the request from the request unit.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1:
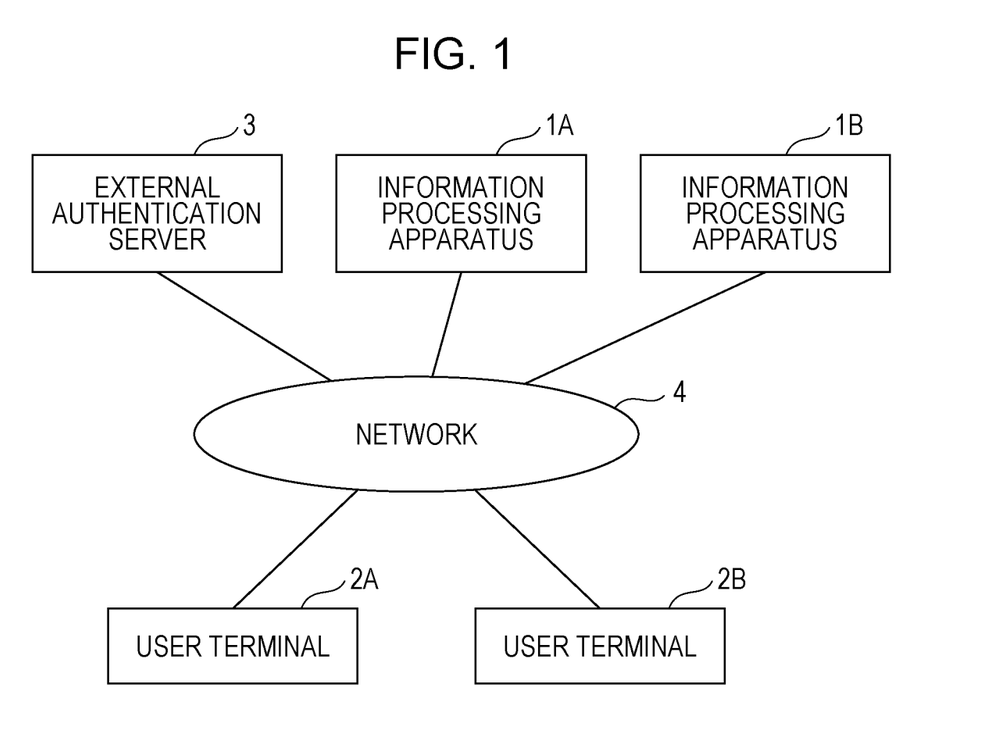
FIG. 1 is a block diagram illustrating the configuration of an information processing system according to a first exemplary embodiment of the present invention.

A first exemplary embodiment of the present invention will be described. FIG. 1 is a block diagram illustrating the configuration of an information processing system according to the first exemplary embodiment of the present invention. The information processing system includes multiple information processing apparatuses 1A and 1B, multiple user terminals 2A and 2B, and an external authentication server 3. The information processing apparatuses 1A and 1B are electrophotographic image forming apparatuses provided with multiple functions, such as printing, copying, and faxing. The user terminals 2A and 2B serve as operation terminals operated by different users. The external authentication server 3 stores pieces of authentication information for authenticating the respective users. The information processing apparatuses 1A and 1B, the user terminals 2A and 2B, and the external authentication server 3 are communicatively connected with one another via a network 4. The information processing apparatuses 1A and 1B are computers that have the same configuration and that perform the same operations. Hereinafter, the information processing apparatuses 1A and 1B are collectively called information processing apparatuses 1. The user terminals 2A and 2B are computers that have the same configuration and that perform the same operations. Hereinafter, the user terminals 2A and 2B are collectively called user terminals 2. Each of the user terminals 2 receives a user operation, and transmits a request to an information processing apparatus 1 in accordance with the operation. Each of the information processing apparatuses 1 stores document data which is generated, for example, through scanning performed by the information processing apparatus 1, or which is transmitted from a user terminal 2, and prints or faxes the document data in accordance with a user request. Three or more information processing apparatuses 1 and three of more user terminals 2 may be present. In FIG. 1, only two information processing apparatuses 1 and two user terminals 2 are illustrated.

User authentication indicates an operation in which each user is identified in order to restrict use for the user in an information processing apparatus. External authentication indicates an authentication system in which correct authentication information with which authentication information that is input by a user to an information processing apparatus is compared is stored in an external apparatus that is different from the information processing apparatus. In contrast, internal authentication indicates an authentication system in which the correct authentication information is stored in the information processing apparatus.

A method may be employed in which, when an information processing apparatus fails to communicate with the external authentication server, for example, due to communication failure, authentication information that is temporarily stored (cached) in the information processing apparatus is used to perform user authentication. Hereinafter, storing authentication information in a storage area of an information processing apparatus is called temporary storage. In a mechanism in which each information processing apparatus stores authentication information of users temporarily, authentication information is stored in the information processing apparatuses in a duplicate manner, causing free storage areas of the information processing apparatuses to be reduced. Typically, the storage capacity of an information processing apparatus is smaller than the storage capacity of an external authentication server. Therefore, when a sufficiently large number of pieces of authentication information are stored in the external authentication server, it is not possible to store authentication information of all of the users in each information processing apparatus temporarily. In addition, success of user authentication causes an information processing apparatus to store authentication information temporarily. Therefore, authentication information of a user is not temporarily stored in an information processing apparatus that has not been used by the user at all. Therefore, when the information processing apparatus fails to communicate with the external authentication server, it is not possible to perform user authentication.

Accordingly, in the first exemplary embodiment, authentication information of each user is temporarily stored only in a single apparatus among multiple information processing apparatuses that are available to the user. In the case where authentication information of a user is not temporarily stored in an information processing apparatus when the user is to use the information processing apparatus, the information processing apparatus (referred to as a host apparatus) transmits an inquiry to a different information processing apparatus (referred to as a different apparatus), obtains authentication information, and performs user authentication. Thus, in the case where a host apparatus transmits an inquiry to a different apparatus, user authentication possibly takes time compared with the case in which the host apparatus stores authentication information temporarily. To reduce this possibility, temporary storage of authentication information is performed in a single information processing apparatus that may be used by a user with the highest frequency, among multiple information processing apparatuses that are available to the user.

Figure 2:
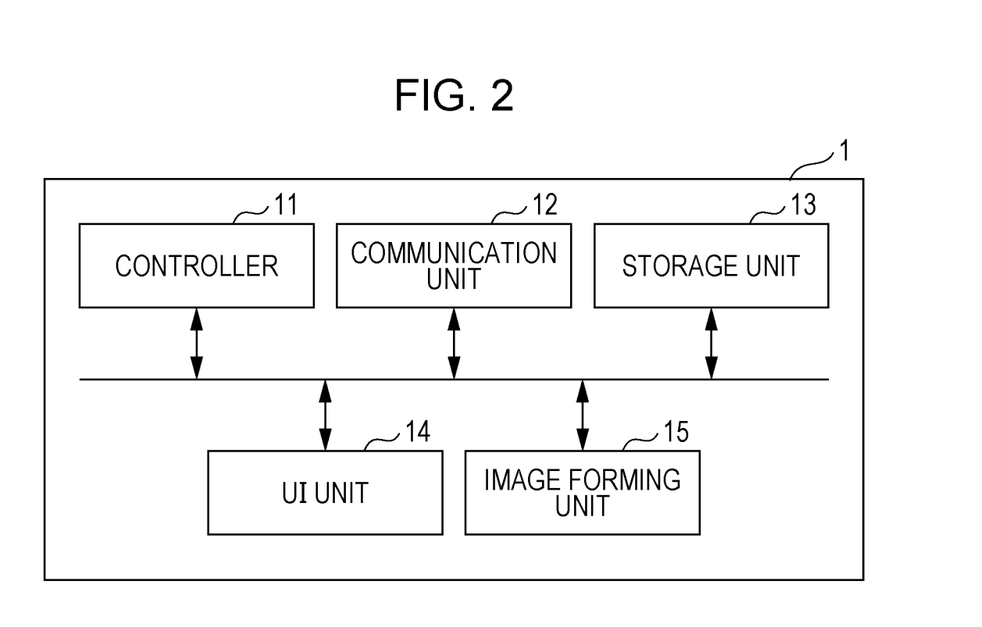
FIG. 2 is a block diagram illustrating the hardware configuration of an information processing apparatus according to the first exemplary embodiment of the present invention.

FIG. 2 is a block diagram illustrating the hardware configuration of an information processing apparatus 1 according to the first exemplary embodiment of the present invention. The information processing apparatus 1 includes a controller 11, a communication unit 12, a storage unit 13, a user interface (UI) unit 14, and an image forming unit 15. The controller 11 includes an arithmetic processing unit such as a central processing unit (CPU), and storage devices, such as a read only memory (ROM) and a random access memory (RAM). In the ROM, programs executed by the CPU are stored. The CPU uses the RAM as a work area to execute programs stored in the ROM and the storage unit 13. Thus, the CPU controls operations of the units of the information processing apparatus 1. The communication unit 12 which includes a communication circuit communicates with the user terminals 2 and the other information processing apparatuses 1. The storage unit 13 is a memory such as a hard disk, and stores data and programs used by the controller 11. The UI unit 14 includes an operation unit provided with operators, such as keys and a touch sensor, and a display unit including a liquid crystal panel and a liquid crystal drive circuit. The UI unit 14 receives a user operation and provides information to a user. The image forming unit 15 forms an image on a sheet by using an electrophotographic system.

Figure 3:
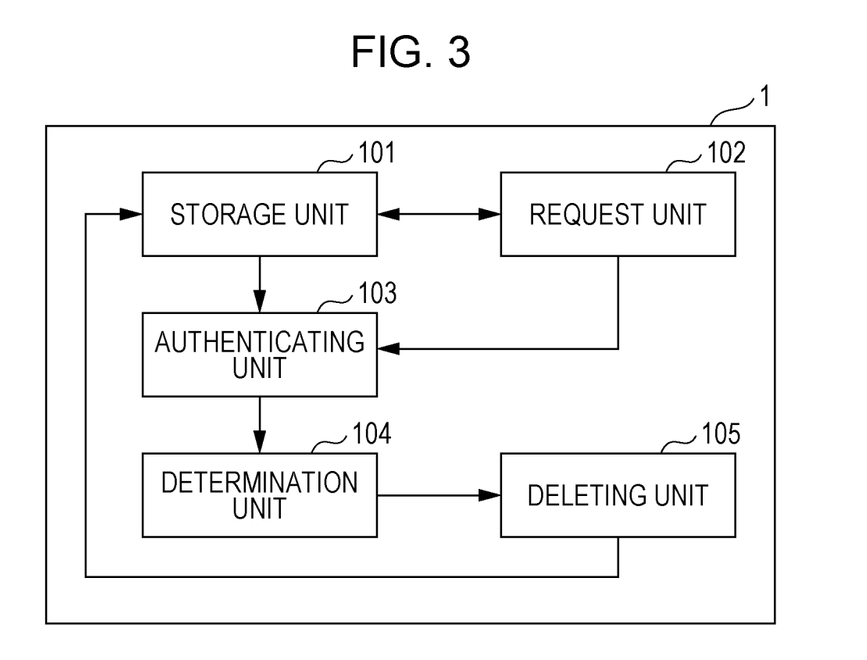
FIG. 3 is a block diagram illustrating the functional configuration of the information processing apparatus.

FIG. 3 is a block diagram illustrating the functional configuration of the information processing apparatus 1. A storage unit 101 is a function implemented through hardware, that is, the storage unit 13, and stores authentication information for performing user authentication. When it is determined that the host apparatus is to store authentication information temporarily in the case where the host apparatus does not store the authentication information temporarily, the storage unit 101 writes, in the storage unit 101, authentication information obtained from a different apparatus in response to a request from a request unit 102. The authentication information may be any information as long as it is information with which user authentication may be performed. For example, the authentication information contains a user identifier for identifying a user, and a password known only by the user. The request unit 102 is a function implemented through hardware, that is, the controller 11 and the communication unit 12, and requests, from a different apparatus, authentication information of a user who is a target of user authentication, when authentication information of the user is not stored in the storage unit 101 temporarily. An authenticating unit 103 is a function implemented through hardware, that is, the controller 11, and performs user authentication by using authentication information stored in the storage unit 101 or authentication information obtained from a different apparatus in response to a request from the request unit 102. A determination unit 104 is a function implemented through hardware, that is, the controller 11, and determines whether the host apparatus or a different apparatus is to store authentication information temporarily. Specifically, the determination unit 104 performs the determination in accordance with a usage history about the user's uses of the host apparatus and the different apparatus. A deleting unit 105 is a function implemented through hardware, that is, the controller 11, and, when a determined condition is satisfied, deletes a usage history about the number of the user's uses of the host apparatus and the number of the user's uses of each of the other information processing apparatuses.

Figure 4:
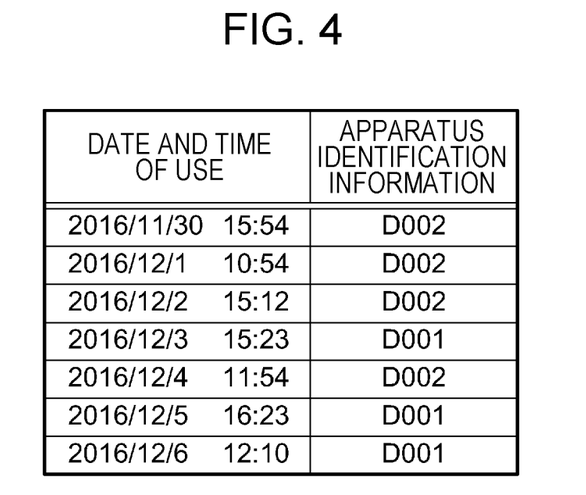
FIG. 4 is a diagram illustrating a usage history stored in the information processing apparatus.

FIG. 4 is a diagram illustrating an exemplary usage history stored in an information processing apparatus 1. As illustrated in FIG. 4, the usage history includes dates and times at which a user uses information processing apparatuses 1, and apparatus identification information that identifies the information processing apparatuses 1. The apparatus identification information is, for example, the serial number or the network address of the information processing apparatus 1.

Figure 5:
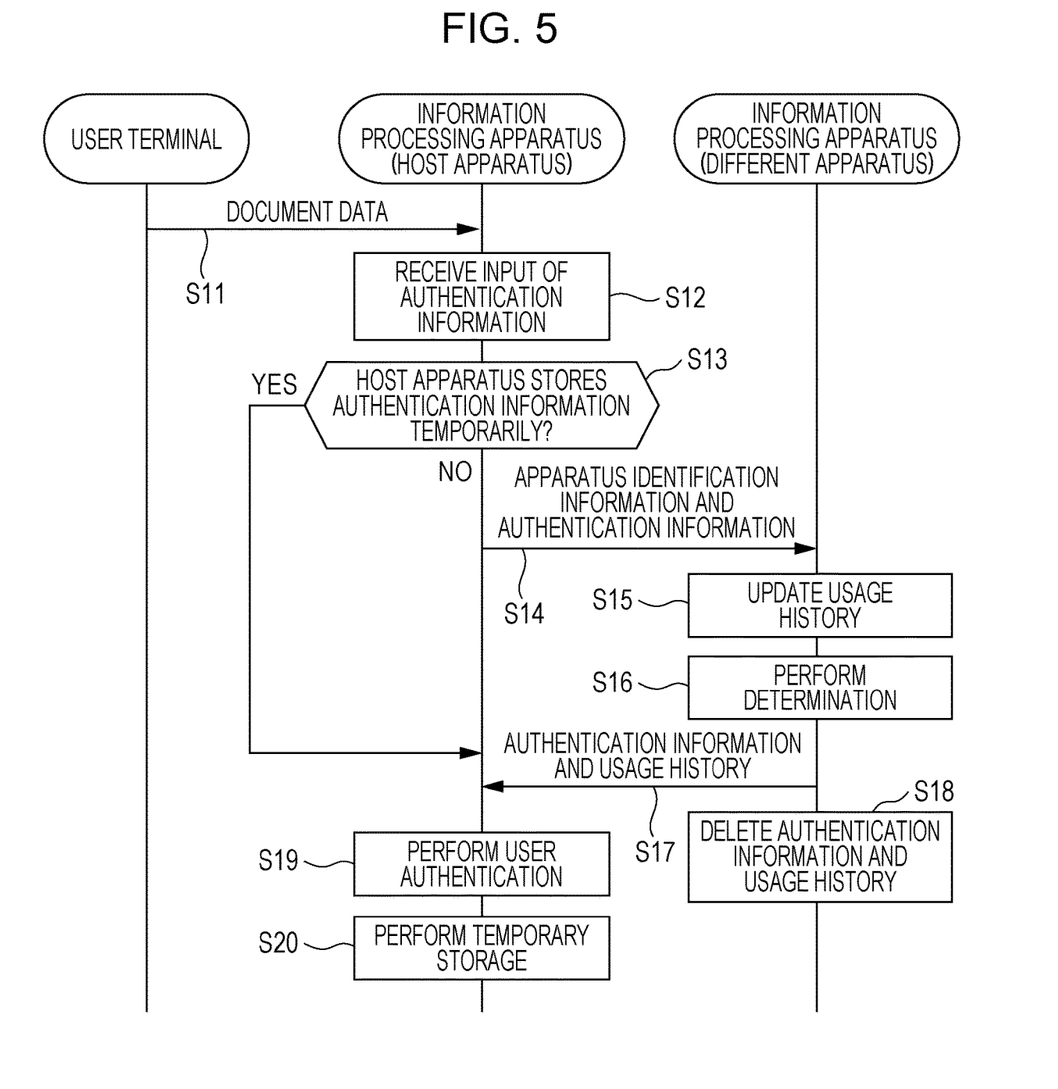
FIG. 5 is a sequence chart of an operation in the information processing system.

FIG. 5 is a sequence chart of an operation in the information processing system. In the description below, apparatus identification information of the information processing apparatus 1A illustrated in FIG. 1 is "D001". Apparatus identification information of the information processing apparatus 1B is "D002". A certain user (referred to as a user X) operates the user terminal 2A, transmits document data to the information processing apparatus 1A, and prints, from the information processing apparatus 1A, a document indicated by the document data. At that time, it is assumed that the usage history illustrated in FIG. 4 and authentication information of the user X are stored in the storage unit 101 of the information processing apparatus 1B. In the example in FIG. 5, it is assumed that it is not possible to communicate with the external authentication server 3, for example, due to communication failure.

The user X first operates the user terminal 2A, transmits document data from the user terminal 2A to the information processing apparatus 1A, and transmits a print instruction (step S11). The user X then goes to the information processing apparatus 1A, and inputs their authentication information (the user ID and the password) to the information processing apparatus 1A. When the request unit 102 of the information processing apparatus 1A receives this input (step S12), the request unit 102 searches pieces of authentication information in the storage unit 101 of the information processing apparatus 1A for the input authentication information. In this example, the authentication information of the user X is not stored in the information processing apparatus 1A temporarily (NO in step S13), and it is not possible to communicate with the external authentication server 3. Therefore, the request unit 102 of the information processing apparatus 1A transmits an inquiry to a different apparatus (in this example, the information processing apparatus 1B) (step S14). The inquiry includes the apparatus identification information of the information processing apparatus 1A and the authentication information that has been received from the user X. If the authentication information of the user X is stored in the information processing apparatus 1A temporarily, the authenticating unit 103 may compare the authentication information temporarily stored with the authentication information that has been received from the user X in step S12, and may perform user authentication.

The determination unit 104 of the information processing apparatus 1B searches the pieces of authentication information in the storage unit 101 of the information processing apparatus 1B for the authentication information that has been transmitted from the information processing apparatus 1A. In this example, the authentication information of the user X is stored temporarily. Therefore, the deleting unit 105 of the information processing apparatus 1B deletes the record of the oldest date and time of use in the usage history in the storage unit 101 of the information processing apparatus 1B, and writes the date and time of use of an operation performed this time and the apparatus identification information of the information processing apparatus 1A, thus updating the usage history (step S15). In this example, in the storage unit 101 of the information processing apparatus 1B, the record of a date and time of use of "2016/11/30 15:54" and the apparatus identification information "D002" is deleted, and, for example, a record of a date and time of use of "2016/12/7 10:01" (the current date and time) and the apparatus identification information "D001" is written.

Then, the determination unit 104 of the information processing apparatus 1B determines an information processing apparatus that is to store the authentication information and the usage history temporarily (step S16). Specifically, the determination unit 104 determines that an information processing apparatus of which the number of uses is the largest in the usage history in the storage unit 101 of the information processing apparatus 1B is to store the authentication information and the usage history temporarily. In this example, the number of uses of the information processing apparatus 1A whose apparatus identification information is "D001" is four, and the number of uses of the information processing apparatus 1B whose apparatus identification information is "D002" is three. Therefore, it is determined that the information processing apparatus 1A is to take charge of temporary storage. That is, an information processing apparatus that is to take charge of temporary storage is changed from the information processing apparatus 1B to the information processing apparatus 1A. When information processing apparatuses of which the numbers of uses are same are present, it is determined that an information processing apparatus that was used at the latest time is to take charge of temporary storage.

The determination unit 104 of the information processing apparatus 1B transmits the authentication information of the user X and the usage history in the storage unit 101 to the information processing apparatus 1A (step S17). After the transmission, the deleting unit 105 of the information processing apparatus 1B deletes the authentication information and the usage history in the storage unit 101 of the information processing apparatus 1B (step S18). A very old record of a usage history has no value. Therefore, when a predetermined period has elapsed from the date and time of use, the deleting unit 105 deletes the record containing the date and time of use.

When the information processing apparatus that is to take charge of temporary storage is not to be changed (when the information processing apparatus 1B still takes charge of temporary storage), the determination unit 104 of the information processing apparatus 1B transmits the authentication information of the user X to the information processing apparatus 1A. After the transmission, the deleting unit 105 of the information processing apparatus 1B does not delete the authentication information and the usage history in the storage unit 101 of the information processing apparatus 1B.

The authenticating unit 103 of the information processing apparatus 1A compares the authentication information transmitted from the information processing apparatus 1B with the authentication information received from the user X in step S12, so as to perform user authentication (step S19). Thus, the user X is permitted to use the information processing apparatus 1A, and a document according to the document data is printed. The storage unit 101 stores the authentication information and the usage history of the user X which are transmitted from the information processing apparatus 1B (step S20).

The first exemplary embodiment described above achieves a mechanism in which all of the information processing apparatuses do not need to store authentication information of all of the users who use the information processing apparatuses.

Second Exemplary Embodiment

The configuration and operation of a second exemplary embodiment are same as those of the first exemplary embodiment except the following points. In the second exemplary embodiment, a time difference from a time at which a user instructs an information processing apparatus 1 from a user terminal 2 to perform processing (a time point in step S11) to a time at which the user inputs authentication information to the information processing apparatus 1 (a time point at step S12) is used as a usage history about timings at which the user uses a host apparatus and a different apparatus. Thus, the determination in step 16 is performed. Specifically, the determination unit 104 determines that an information processing apparatus 1 having a less time difference is to take charge of temporary storage.

Figure 6:
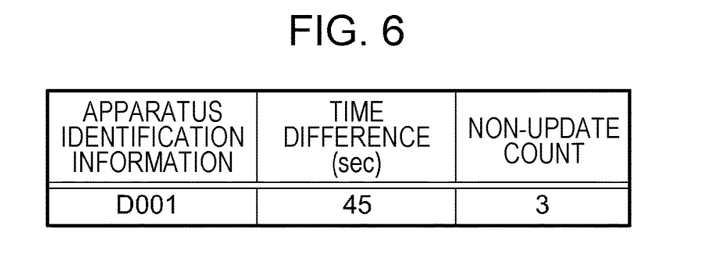
FIG. 6 is a diagram illustrating a usage history stored in an information processing apparatus according to a second exemplary embodiment of the present invention.

The storage unit 101 stores a usage history as illustrated in FIG. 6. The usage history includes apparatus identification information of information processing apparatuses 1 used by a user, time differences, and non-update counts. Each of the time differences is a time difference from a time at which an information processing apparatus 1 is instructed from a user terminal 2 to perform processing to a time at which the user inputs authentication information to the information processing apparatus 1. When the time difference made this time is more than a corresponding one of the stored time differences, the storage unit 101 does not update the stored time difference, and the determination unit 104 does not change the information processing apparatus 1 that stores the authentication information temporarily. When the time difference made this time is equal to or less than the stored time difference, the storage unit 101 updates the stored time difference with the time difference made this time, and the determination unit 104 determines that the information processing apparatus 1 used this time is to store the authentication information and the usage history of the user temporarily. The time difference is a value in accordance with the distance between the user terminal 2 used by the user and the information processing apparatus 1. Therefore, the determination described above is performed so that an information processing apparatus 1 close to the user stores the authentication information and the usage history.

For example, when a user terminal 2 used by a user is far from all of the information processing apparatuses 1, for example, because the user's desk is changed in the office, or when a time difference that is much less than a typical time difference is recorded (for example, the user dashes to an information processing apparatus 1 from the place of the user terminal 2 because the user needs to perform printing urgently), a case in which the time difference is not updated after that may occur. Therefore, a non-update count (the number of uses in which apparatus usage information is not updated) is included in a usage history. Thus, the time difference is compulsorily updated at certain time intervals. For example, when the time difference made this time is compared with the stored time difference, if the non-update count exceeds a threshold, the deleting unit 105 initializes the non-update count to zero, and the storage unit 101 updates the time difference. Then, the determination unit 104 determines that the information processing apparatus 1 used by the user is to take charge of temporary storage. If the non-update count does not exceed the threshold, and if the time difference made this time is more than the time difference stored temporarily, the storage unit 101 adds 1 to the non-update count, and does not update the time difference. The determination unit 104 does not change the information processing apparatus 1 that takes charge of temporary storage. If the non-update count does not exceed the threshold, and if the time difference made this time is equal to or less than the time difference stored temporarily, the deleting unit 105 initializes the non-update count to zero, and the storage unit 101 updates the time difference. The determination unit 104 determines that the information processing apparatus 1 used by the user is to take charge of temporary storage.

The second exemplary embodiment described above achieves a mechanism in which all of the information processing apparatuses do not need to store authentication information of all of the users who use the information processing apparatuses.

In the first and second exemplary embodiments described above, authentication information of each user is temporarily stored only in one of the information processing apparatuses available to the user. Alternatively, only some of the information processing apparatuses available to the user may take charge of temporary storage. That is, the number of information processing apparatuses that take charge of temporary storage may be one or more, but is less than the total of the information processing apparatuses available to the user.

In the description in the first and second exemplary embodiments, the information processing apparatus 1B (different apparatus) determines an information processing apparatus that takes charge of temporary storage, in accordance with authentication information transmitted from the information processing apparatus 1A (host apparatus) and a usage history stored in the information processing apparatus 1B (different apparatus). Instead of the information processing apparatus 1B (different apparatus), the information processing apparatus 1A (host apparatus) may perform the determination. In this case, the information processing apparatus 1A (host apparatus) obtains the usage history from the information processing apparatus 1B (different apparatus) so as to perform the determination.

In the first exemplary embodiment, when a determined condition, such as a case in which the number of records in a usage history reaches a threshold, or a case in which a predetermined period has elapsed from a date and time of use, is satisfied, a record of the usage history about the number of the user's uses of a host apparatus and the number of the user's uses of a different apparatus may be deleted.

In the second exemplary embodiment, in the case where a determined condition such as a case in which the non-update count reaches the threshold is satisfied, a usage history indicating timings at which a user uses a host apparatus and a different apparatus may be initialized.

The determination logic described in the first exemplary embodiment may be combined, for use, with that in the second exemplary embodiment.

The present invention may be also provided in the form of a program for causing a computer to function as an information processing apparatus 1 or in the form of a recording medium storing the program. The program provided by the present invention may be downloaded to a computer via a network such as the Internet.

An information processing apparatus provided by the present invention may be implemented by using a single apparatus in which all of the functions in FIG. 3 are integrally provided, or may be implemented by using multiple apparatuses in which these functions are provided in a distributed manner. An information processing apparatus provided by the present invention is not limited to an image forming apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory that stores authentication information for performing user authentication;
a computer processor that performs a method comprising:
when authentication information of a user is not stored in the memory, requesting the authentication information of the user from a different information processing apparatus;
performing the user authentication by using the authentication information stored in the memory or the authentication information obtained from the different information processing apparatus in response to the request; and determining whether the information processing apparatus or the different information processing apparatus is to store the authentication information in accordance with a usage history about the user's uses of the information processing apparatus and the different information processing apparatus, wherein, when the authentication information is not stored in the information processing apparatus, if it is determined that the information processing apparatus is to store the authentication information, the memory stores the authentication information obtained in response to the request.

2. The information processing apparatus according to claim 1,
wherein the computer processor performs the determination in accordance with the usage history indicating the number of the user's uses of the information processing apparatus and the number of the user's uses of the different information processing apparatus.

3. The information processing apparatus according to claim 2, further comprising:
a deleting unit,
wherein, when a determined condition is satisfied, the deleting unit deletes the usage history indicating the number of the user's uses of the information processing apparatus and the number of the user's uses of the different information processing apparatus.

4. The information processing apparatus according to claim 3,
wherein the memory stores the authentication information of the user and the usage history about the user's uses of the information processing apparatus and the different information processing apparatus, and
wherein when the information processing apparatus does not store the authentication information, if it is determined that the information processing apparatus is to store the authentication information, the memory stores the authentication information and the usage history.

5. The information processing apparatus according to claim 2,
wherein the memory stores the authentication information of the user and the usage history about the user's uses of the information processing apparatus and the different information processing apparatus, and
wherein when the information processing apparatus does not store the authentication information, if it is determined that the information processing apparatus is to store the authentication information, the memory stores the authentication information and the usage history.

6. The information processing apparatus according to claim 1,
wherein the computer processor performs the determination in accordance with the usage history indicating a time at which the user uses the information processing apparatus and a time at which the user uses the different information processing apparatus.

7. The information processing apparatus according to claim 6, further comprising:
a deleting unit,
wherein, when a determined condition is satisfied, the deleting unit initializes the usage history indicating a time at which the user uses the information processing apparatus and a time at which the user uses the different information processing apparatus.

8. The information processing apparatus according to claim 7,
wherein the memory stores the authentication information of the user and the usage history about the user's uses of the information processing apparatus and the different information processing apparatus, and
wherein when the information processing apparatus does not store the authentication information, if it is determined that the information processing apparatus is to store the authentication information, the memory stores the authentication information and the usage history.

9. The information processing apparatus according to claim 6,
wherein the memory stores the authentication information of the user and the usage history about the user's uses of the information processing apparatus and the different information processing apparatus, and
wherein when the information processing apparatus does not store the authentication information, if it is determined that the information processing apparatus is to store the authentication information, the memory stores the authentication information and the usage history.

10. The information processing apparatus according to claim 1,
wherein the memory stores the authentication information of the user and the usage history about the user's uses of the information processing apparatus and the different information processing apparatus, and
wherein when the information processing apparatus does not store the authentication information, if it is determined that the information processing apparatus is to store the authentication information, the memory stores the authentication information and the usage history.

11. The information processing apparatus according to claim 1,
wherein the memory stores the authentication information of the user and the usage history about the user's uses of the information processing apparatus and the different information processing apparatus, and
wherein when the information processing apparatus does not store the authentication information, if it is determined that the information processing apparatus is to store the authentication information, the memory stores the authentication information and the usage history.

12. An information processing system comprising:
a plurality of information processing apparatuses,
wherein each of the plurality of information processing apparatuses includes
a memory that stores authentication information for performing user authentication,
a computer processor that performs a method comprising:
when authentication information of a user is not stored in the memory, requesting the authentication information of the user from a different information processing apparatus,
performing the user authentication by using the authentication information stored in the memory or the authentication information obtained from the different information processing apparatus in response to the request, and
determining whether the information processing apparatus or the different information processing apparatus is to store the authentication information in accordance with a usage history about the user's uses of the information processing apparatus and the different information processing apparatus, wherein, when the authentication information is not stored in the information processing apparatus, if it is determined that the information processing apparatus is to store the authentication information, the memory stores the authentication information obtained in response to the request.

13. An information processing apparatus comprising:

a memory that stores authentication information for performing user authentication;

a computer processor that performs a method comprising:

when authentication information of a user is not stored in the memory, requesting the authentication information of the user from a different information processing apparatus;

performing the user authentication by using the authentication information stored in the memory or the authentication information obtained from the different information processing apparatus in response to the request; and determining whether the information processing apparatus or the different information processing apparatus is to store the authentication information, wherein, when the authentication information is not stored in the information processing apparatus, if it is determined that the information processing apparatus is to store the authentication information, the memory stores the authentication information obtained in response to the request, wherein the memory stores the authentication information of the user and a usage history about the user's uses of the information processing apparatus and the different information processing apparatus, and wherein when the information processing apparatus does not store the authentication information, if it is determined that the information processing apparatus is to store the authentication information, the memory stores the authentication information and the usage history.

* * * * *